(No Model.)

S. L. TRIPPE.
ELECTRODE FOR SECONDARY BATTERIES.

No. 388,601. Patented Aug. 28, 1888.

Witnesses:

Inventor:
Sylvanus L. Trippe,
by
his Attorney.

UNITED STATES PATENT OFFICE.

SYLVANUS L. TRIPPE, OF ST. LOUIS, MISSOURI.

ELECTRODE FOR SECONDARY BATTERIES.

SPECIFICATION forming part of Letters Patent No. 388,601, dated August 28, 1888.

Application filed June 10, 1887. Serial No. 240,936. (No model.)

*To all whom it may concern:*

Be it known that I, SYLVANUS L. TRIPPE, a citizen of the United States, residing at St. Louis, in the county of St. Louis and State of Missouri, have invented certain new and useful Improvements in Electrodes for Secondary Batteries; and I do hereby declare the following to be a full, clear, and exact description of the invention, such as will enable others skilled in the art to which it appertains to make and use the same.

This invention relates to electric batteries.

The object of the invention is readily to form plates for secondary and other batteries without the difficulties incident to casting.

The invention consists in an electrode for a secondary or other battery composed of an exterior perforated plate or envelope having attached to it internally a suitable conducting-wire, and an interior perforated and corrugated plate, there being a suitable composition between the plates, and the plates being held or pressed together.

In preparing an electrode I proceed as follows: I take a sheet of any suitable metallic substance, perforate the same with holes, and attach to it the conducting wire or wires. I then bend the plate upon itself centrally with the conducting wire or wires within. The plate so bent forms an envelope. I then take another plate of suitable metallic substance, corrugate and perforate the same, and place it between the leaves of the bent or envelope plate, preferably in such manner that the corrugations will be horizontal, then place a suitable composition between the leaves of the enveloping plate and the interposed plate, and finally press the whole together, forming an electrode. For the positive electrode the envelope is composed, preferably, of an alloy of silver, lead, and zinc, as in my patent, No. 344,882, granted July 6, 1886, the inner plate being of lead, while the composition employed between the plates is minium formed into a paste with sulphuric acid. For the negative electrode the envelope is composed, preferably, of lead and the inner plate of silver, lead, and zinc, while the interposed composition is made of litharge mixed with an equal weight of finely-divided metallic lead, the whole made into a paste with sulphuric acid. The conducting-wire preferred is in the nature of a frame-work with cross-wires, the frame proper being preferably of bars, for superior firmness, and the cross-wires of copper, the entire conducting-wire—that is, both the frame and the cross-wires—being heavily plated with silver.

The accompanying drawings serve to illustrate an embodiment of my invention.

Figure 1:
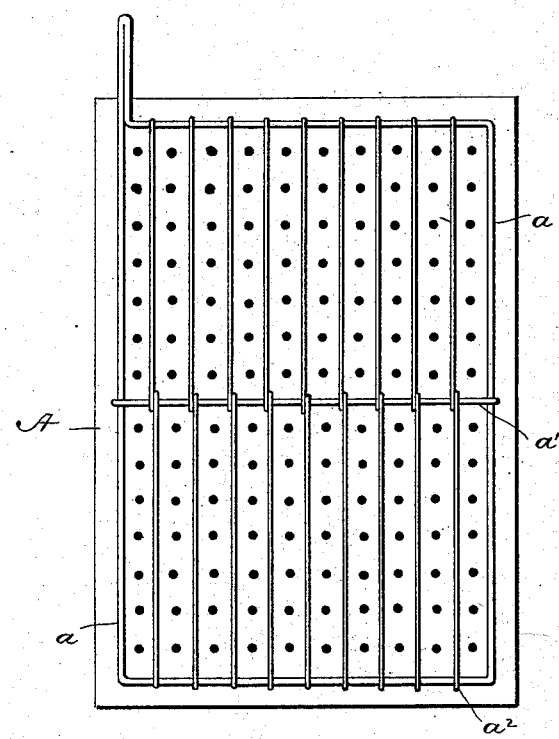
Figure 2:
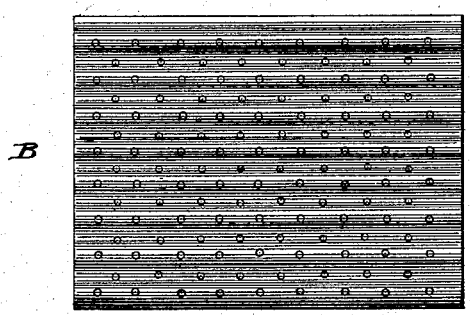
Figure 3:
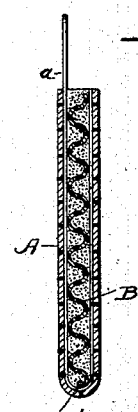

In the drawings, Figure 1 represents a side view of a plate constructed in accordance with my invention, showing the inner side of the plate before it is bent. Fig. 2 represents a side view of one of the corrugated interposed sheets; and Fig. 3 represents a vertical sectional view of an electrode completed, showing the relative arrangement of the outer plate or envelope and the interposed corrugated plate.

The outer plate or envelope is indicated in the drawings by A, and is constructed of a sheet of any suitable perforated metallic substance, to one side of which is attached a large wire, $a$, which extends entirely around the plate near its edge, and is extended at a convenient point beyond the end of the plate to form an electrical connector and means of attachment to the battery-cell. About midway between the ends of this plate, and extending laterally across the same, is provided a wire, $a'$, of similar size, the ends of which are attached to the wire $a$. Lengthwise upon the plate are also secured fine wires $a^2$, attached at each end to the wire $a$, and which are twisted or doubled around the central wire, $a'$. These wires thus arranged and secured together form a frame which serves as a conducting-wire and gives additional strength to the plate. The entire conducting-wire—that is, both the frame and cross-wires—is preferably made of copper and heavily plated with silver. The plate is then bent upon itself centrally with the conducting-wires within, the bent plate thus forming an envelope. Within this outer envelope is placed a sheet of similar metallic substance, also perforated and provided with corrugations, which plate B is placed between the leaves of the envelope in such manner that the corrugations will be held in a horizontal position. When the plates have been placed as above set forth, a suitable composition is placed between the outer plate or envelope or interposed plate, and the whole is pressed together, and, if desired, thus secured by suitable metal rivets, preferably lead or lead alloyed with antimony. When the plates have been pressed into this position, as shown in Fig. 3, the end of the wire $a$ extends above them at a convenient point and provides a ready means of connection for the electrode. The corrugations serve to hold in place the oxides which are formed by the electric current, or which may have been mechanically applied to the inside leaves, and prevent them from falling down and accumulating in the bottom of the envelope. The perforations in the plate allow the fluid to circulate freely and come in contact with all the parts of the electrode.

Having thus fully described my invention, what I claim as new, and desire to secure by Letters Patent, is—

1. In a secondary or storage battery, a sheet of perforated metal bent or folded and a conducting-wire frame comprising vertical and horizontal wires attached to its inner side to form an outer covering or envelope for the electrode, substantially as set forth.

2. An electrode for a secondary or other battery, composed of an exterior perforated plate or envelope having attached to it internally a suitable conducting-wire and an interior perforated and corrugated plate, there being a suitable composition between the plates, and the whole being held or pressed together, substantially as set forth.

In testimony whereof I affix my signature in presence of two witnesses.

SYLVANUS L. TRIPPE.

Witnesses:
R. G. DYRENFORTH,
W. W. MORTIMER.